(12) United States Patent
Kumar

(10) Patent No.: US 11,318,902 B2
(45) Date of Patent: May 3, 2022

(54) VEHICLE GRILLE ASSEMBLY

(71) Applicant: Toyota Motor Engineering & Manufacturing North America, Inc., Plano, TX (US)

(72) Inventor: Praveen Kumar, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 53 days.

(21) Appl. No.: 16/895,647

(22) Filed: Jun. 8, 2020

(65) Prior Publication Data

US 2021/0380058 A1 Dec. 9, 2021

(51) Int. Cl.
*B60R 19/52* (2006.01)
*F16B 21/06* (2006.01)
*B60Q 1/28* (2006.01)
*B60R 13/00* (2006.01)

(52) U.S. Cl.
CPC ............ *B60R 19/52* (2013.01); *F16B 21/065* (2013.01); *B60Q 1/28* (2013.01); *B60R 13/005* (2013.01); *B60R 2019/525* (2013.01)

(58) Field of Classification Search
CPC . B60R 19/52; B60R 13/005; B60R 2019/525; F16B 21/065; B60Q 1/28
USPC ................ 293/115, 117; 296/193.1, 1.08
See application file for complete search history.

(56) References Cited

U.S. PATENT DOCUMENTS

| | | | | |
|---|---|---|---|---|
| 6,931,708 B1* | 8/2005 | Elwell | ...................... | G09F 21/04 29/428 |
| 7,613,327 B2 | 11/2009 | Stam et al. | | |
| 8,480,142 B2* | 7/2013 | Wuerfel | ................ | B60R 19/483 293/117 |
| 9,776,585 B2* | 10/2017 | Wey | ......................... | B60R 19/52 |
| 9,828,036 B2* | 11/2017 | Frayer | ................... | G01S 13/931 |
| 9,834,155 B2* | 12/2017 | Gong | ....................... | B29C 69/02 |
| 9,988,000 B2* | 6/2018 | Barros Alonso | ...... | B60R 21/203 |
| 10,679,524 B1* | 6/2020 | Mouton | ..................... | G09F 7/18 |
| 11,073,600 B2* | 7/2021 | Hellinger | ................. | G01S 7/032 |
| 11,128,710 B2* | 9/2021 | Binder | ..................... | H04L 67/12 |
| 2006/0186681 A1* | 8/2006 | Elwell | ................... | B60R 13/005 296/1.08 |

(Continued)

OTHER PUBLICATIONS

McMaster-Carr Product Sheet, found at: https://www.mcmaster.com/spring-nuts//push-on-external-retaining-rings/ (accessed Jun. 8, 2020).

(Continued)

*Primary Examiner* — D Glenn Dayoan
*Assistant Examiner* — E Turner Hicks
(74) *Attorney, Agent, or Firm* — Christopher G. Darrow; Darrow Mustafa PC

(57) ABSTRACT

A grille assembly for a vehicle includes a vehicle grille having an opening with at least a pair of opposed edges, and at least one tab extending along at least one edge of the pair of opposed edges. The at least one tab has a base portion, an end portion, and two opposed faces extending between the base portion and end portion. The at least one tab is tapered such that a cross-sectional area of the tab taken along a plane extending perpendicular to either face of the opposed faces of the tab decreases in a direction extending from the base portion toward the end portion.

12 Claims, 6 Drawing Sheets

(56) References Cited

U.S. PATENT DOCUMENTS

| | | | | |
|---|---|---|---|---|
| 2011/0133498 A1* | 6/2011 | Huang-Tsai | ............ | B60R 19/52 |
| | | | | 293/115 |
| 2011/0278407 A1* | 11/2011 | Osiecki | .................. | G09F 13/08 |
| | | | | 248/206.5 |
| 2013/0107046 A1* | 5/2013 | Forgue | .................... | B60R 19/52 |
| | | | | 348/148 |
| 2015/0028605 A1* | 1/2015 | Maier | ..................... | B60R 19/52 |
| | | | | 293/115 |
| 2015/0353043 A1* | 12/2015 | Mettler | .................. | B60R 19/52 |
| | | | | 293/115 |
| 2019/0143922 A1* | 5/2019 | Chuptys | .................. | B60Q 1/26 |
| | | | | 293/117 |
| 2019/0143923 A1* | 5/2019 | Bischoff | ................ | B60R 13/10 |
| | | | | 293/115 |
| 2020/0324739 A1* | 10/2020 | Singh | ................... | B62D 25/085 |
| 2020/0339053 A1* | 10/2020 | Bicego | ................. | B60R 13/005 |
| 2021/0122302 A1* | 4/2021 | McClelland | ............ | G09F 13/04 |

OTHER PUBLICATIONS

SRT Grille Emblem Mounting Plate, located at: https://www.pinterest.at/pin/419186677798714323/ (accessed Jun. 8, 2020).

* cited by examiner

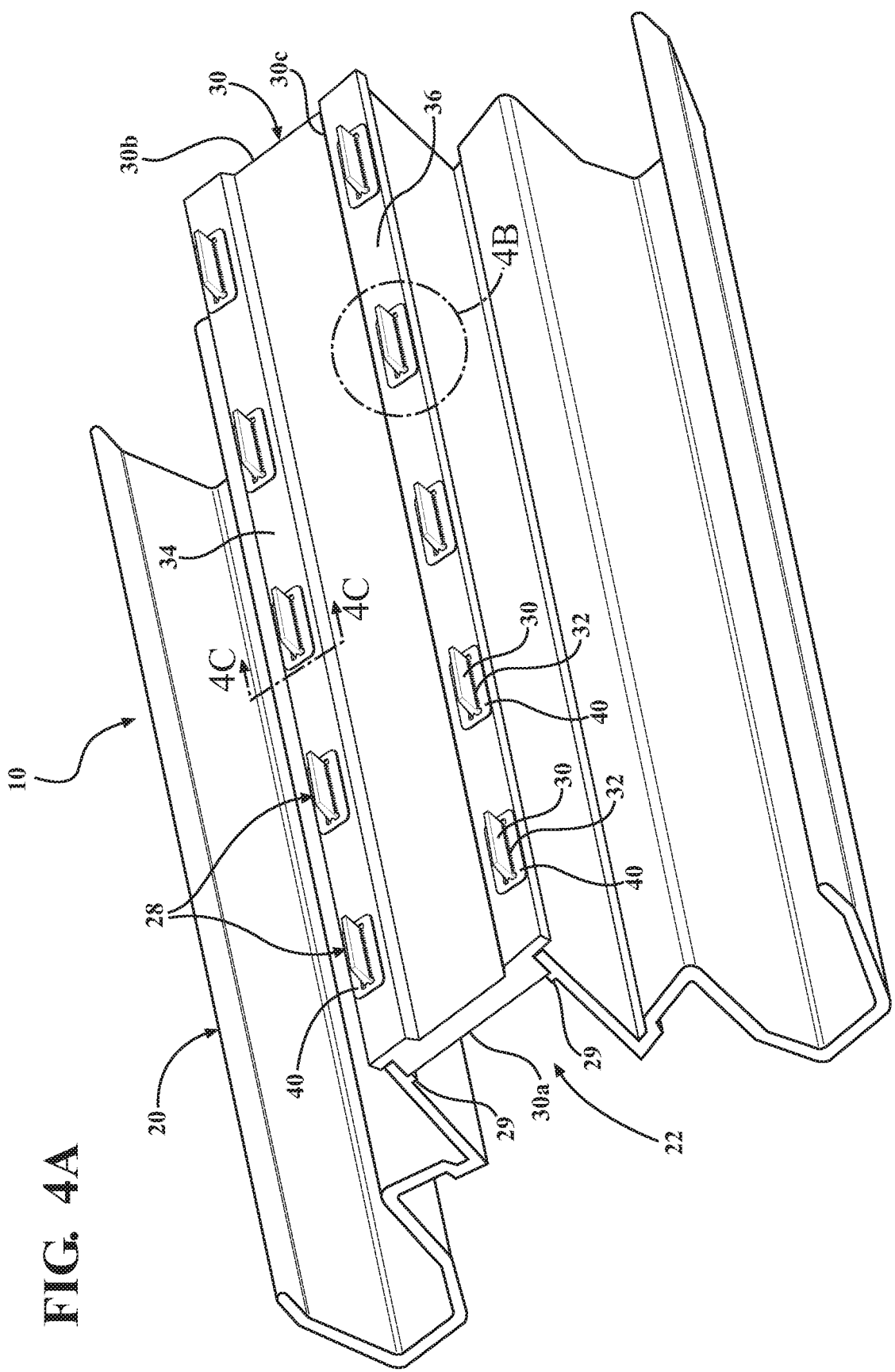

VEHICLE GRILLE ASSEMBLY

TECHNICAL FIELD

The present invention relates to vehicle front grilles and, more particularly, to a vehicle front grille incorporating an attachment for lighting and/or decorative purposes.

BACKGROUND

A vehicle grille may have emblems, lights, or other attachments secured thereto for various purposes. Securement of such elements to the grille involves the application of screws, nuts, studs and/or other fasteners, which increases assembly time and the cost of the assembly. Also, vibration of the grille and associated attachments during vehicle use may loosen such fasteners over time.

SUMMARY

In one aspect of the embodiments described herein, a grille assembly for a vehicle includes a vehicle grille having an opening with at least a pair of opposed edges, and at least one tab extending along at least one edge of the pair of opposed edges. The at least one tab has a base portion, an end portion, and two opposed faces extending between the base portion and end portion. The at least one tab is tapered such that a cross-sectional area of the tab taken along a plane extending perpendicular to either face of the opposed faces of the tab decreases in a direction extending from the base portion toward the end portion.

BRIEF DESCRIPTION OF THE DRAWINGS

FIG. 4A is a schematic rear perspective view of a grille assembly in accordance with an embodiment described herein, showing the grille attachment of FIG. 2 secured to the grille of FIGS. 1A-1B using multiple retaining members as shown in FIG. 3.

DETAILED DESCRIPTION

Figure 1A:
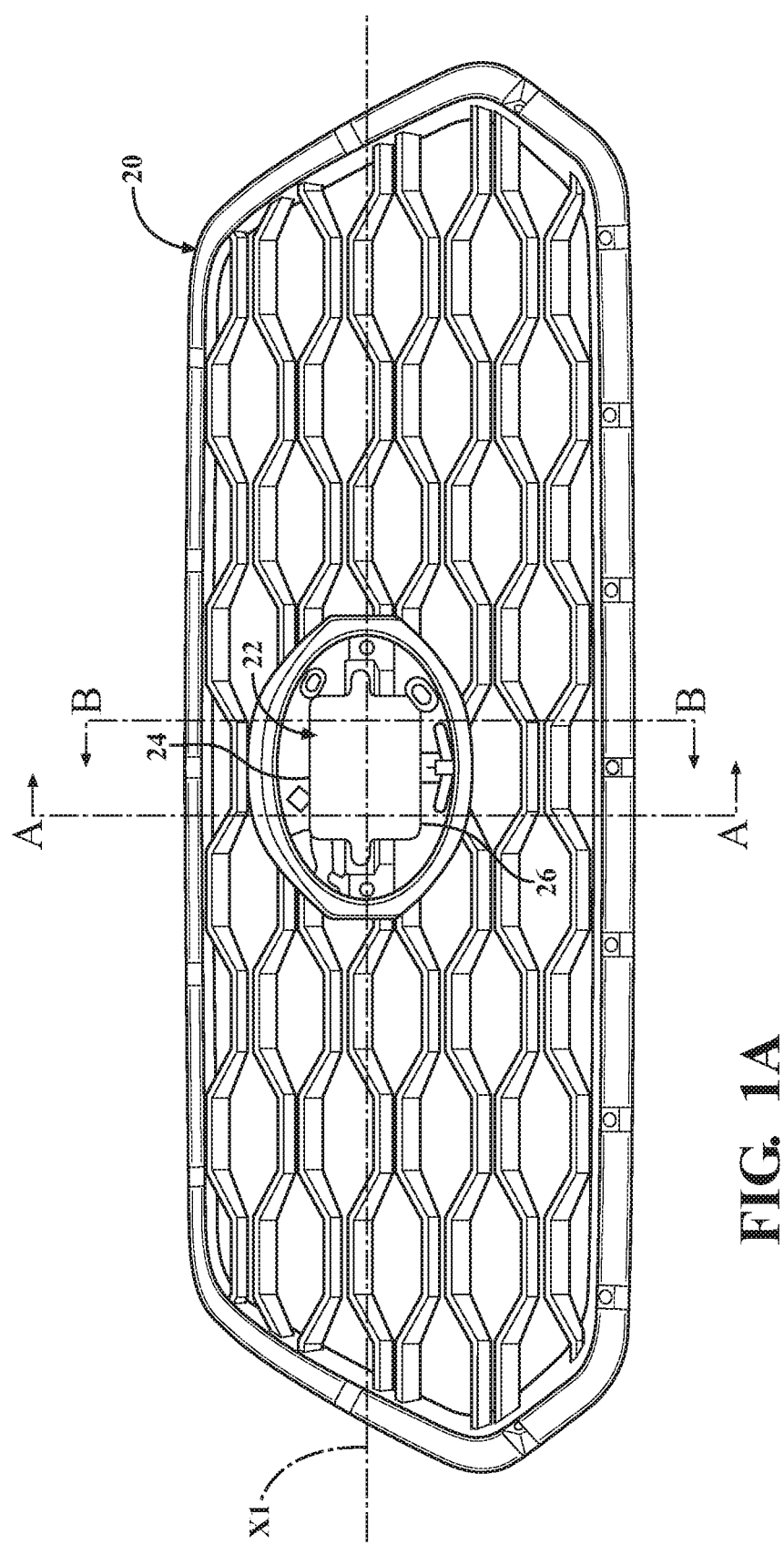
FIG. 1A is a schematic rear view of a vehicle grille in accordance with an embodiment described herein.

Embodiments described herein relate to a grille assembly for a vehicle. The grille assembly includes a vehicle grille having an opening with at least a pair of opposed edges, and at least one tab extending along at least one edge of the pair of opposed edges. The at least one tab has a base portion, an end portion, and two opposed faces extending between the base portion and end portion. The at least one tab has a rectangular cross-sectional shape. The at least one tab is tapered such that a cross-sectional area of the tab taken along a plane extending perpendicular to either face of the opposed faces of the tab decreases in a direction extending from the base portion toward the end portion. The grille assembly also includes a grille attachment secured to the grille. The grille attachment may be an emblem or a lighting source, for example. The rectangular cross-sectional shape of the tab aids in maximizing surface area for contact by serrations of a rectangular retaining member configured engage the tab to secure the grille attachment to the grille. The serrations contact outer surfaces of the tab and deflect when the retaining member is pushed onto the tab. The serrations may be pre-bent in a direction of insertion of the tab into an opening of the retaining member. This may provide a lead-in for the tab. The serrations may also be structured so as to contact the tab only after an end of the tab has been inserted through the retaining member opening. This may help defer the application of the forces needed to press the retaining member onto the tab until the retaining member is partially seated on the tab.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Referring to the drawings, embodiments of a vehicle grille assembly 10 are described herein. The grille assembly 10 may include a grille 20 and a grille attachment 30 secured to the grille 20 by one or more retaining members 40. In one or more applications, the grille assembly 10 is mounted on a front of a vehicle, such as a conventional passenger vehicle (not shown).

Figure 1B:
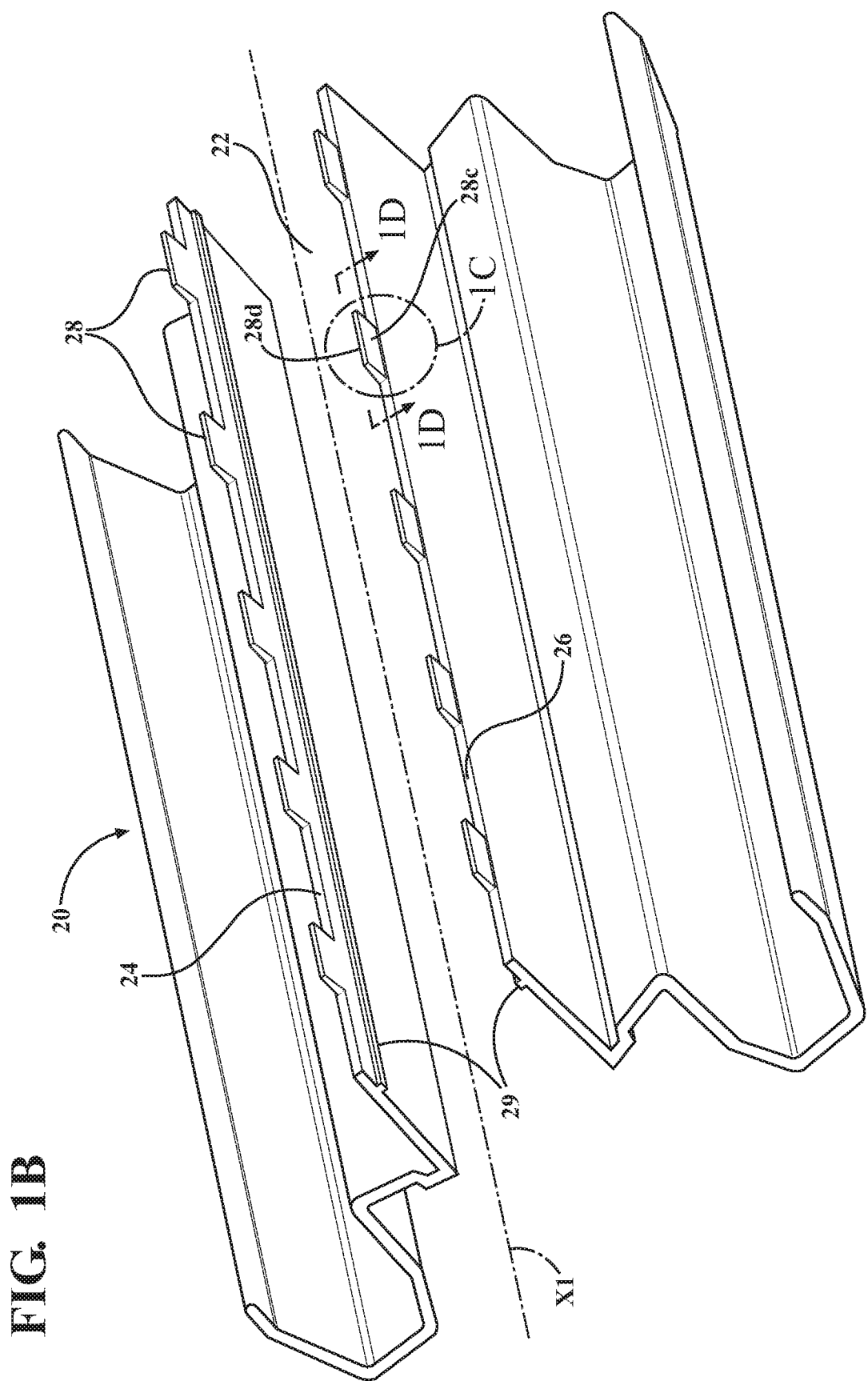
FIG. 1B is a magnified schematic rear perspective view of a portion of the grille shown in FIG. 1A.
Figure 1C:
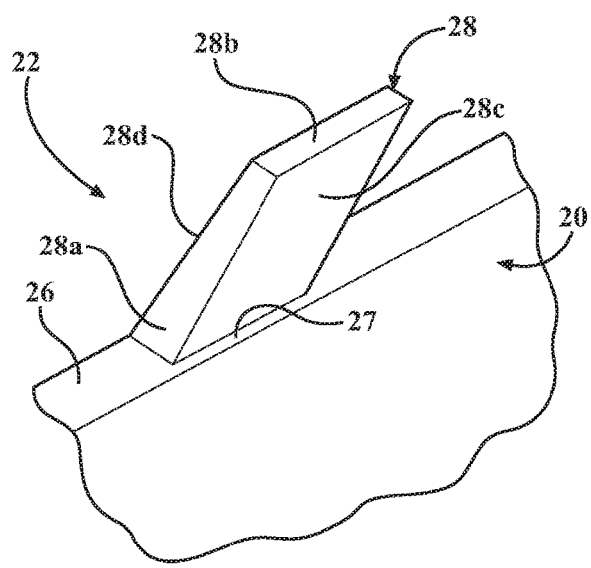
FIG. 1C is a schematic perspective view of a first side of an exemplary tab extending from a portion of the vehicle grille of FIGS. 1A-1B.
Figure 1D:
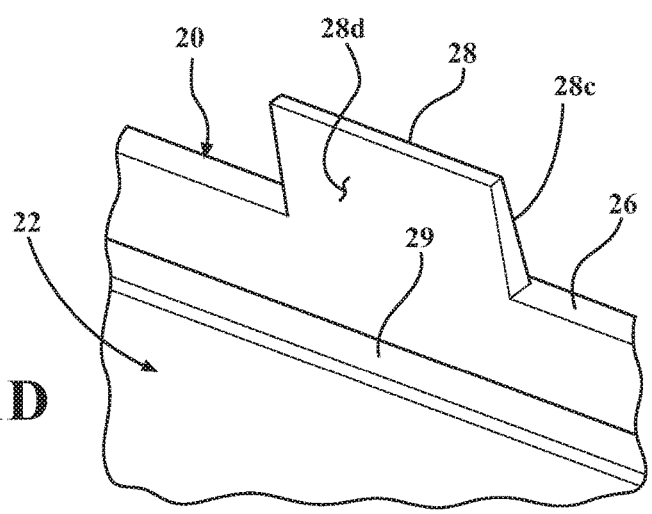
FIG. 1D is a schematic side perspective view of a second side of the exemplary tab of FIG. 1C opposite the first side of the tab, taken from a perspective inside the grille opening.

FIG. 1A is a schematic rear view of a vehicle grille 20 in accordance with an embodiment described herein. FIG. 1B is a rear perspective view of a center portion of the grille 20 shown in FIG. 1A, taken between section planes A and B of FIG. 1A. In one or more arrangements, the grille 20 has an opening 22 with at least a pair of opposed edges 24, 26. At least one tab 28 extends along at least one edge of the pair of opposed edges 24, 26. In the embodiment shown, a plurality of similarly configured tabs 28 extend from and along each of the edges 24 and 26. FIG. 1C is a perspective view of a first side of an exemplary tab 28 extending from a portion of the vehicle grille 20 of FIGS. 1A-1B. FIG. 1D is a perspective view of a second side of the exemplary tab 28 of FIG. 1C, opposite the tab first side.

Edges 24 and 26 may be "mirror-images" of each other with respect to a plane X1 bisecting the opening 22. Referring to FIGS. 1C and 1D, each tab 28 may have a base portion 28a, an end portion 28b, and two opposed faces 28c, 28d extending between the respective base portion 28a and end portion 28b. Tab faces 28d may face toward grille opening 22, while tab faces 22c face away from grille opening 22. Each tab 28 may be tapered such that a cross-sectional area of the tab taken along a plane extending perpendicular to either face of the opposed faces 28c, 28d decreases in a direction extending from the base portion 28a toward the end portion 28b. Each tab 28 may have a rectangular cross-sectional shape. The rectangular cross-sectional shape of the tab aids in maximizing surface area for contact by serrations of a rectangular retaining member 40 (described below) configured engage the tab 28 to secure a grille attachment 30 to the grille 20, as described herein.

In one or more arrangements, tabs on opposite sides of the opening may be positioned directly opposite each other as shown in FIGS. 1B and 4A. In other arrangements, tabs along one side of the opening may be positioned along respective lines bisecting distances separating adjacent ones of tabs 28 on the opposite side of the opening (i.e., a "staggered" arrangement). The grille 20 may be formed from any suitable polymer material, thereby enabling tabs 28 having the characteristics described herein to be molded integrally into the grille 20. A shoulder 27 may be formed on each of edges 24, 26 adjacent each tab face 28c.

Figure 4B:
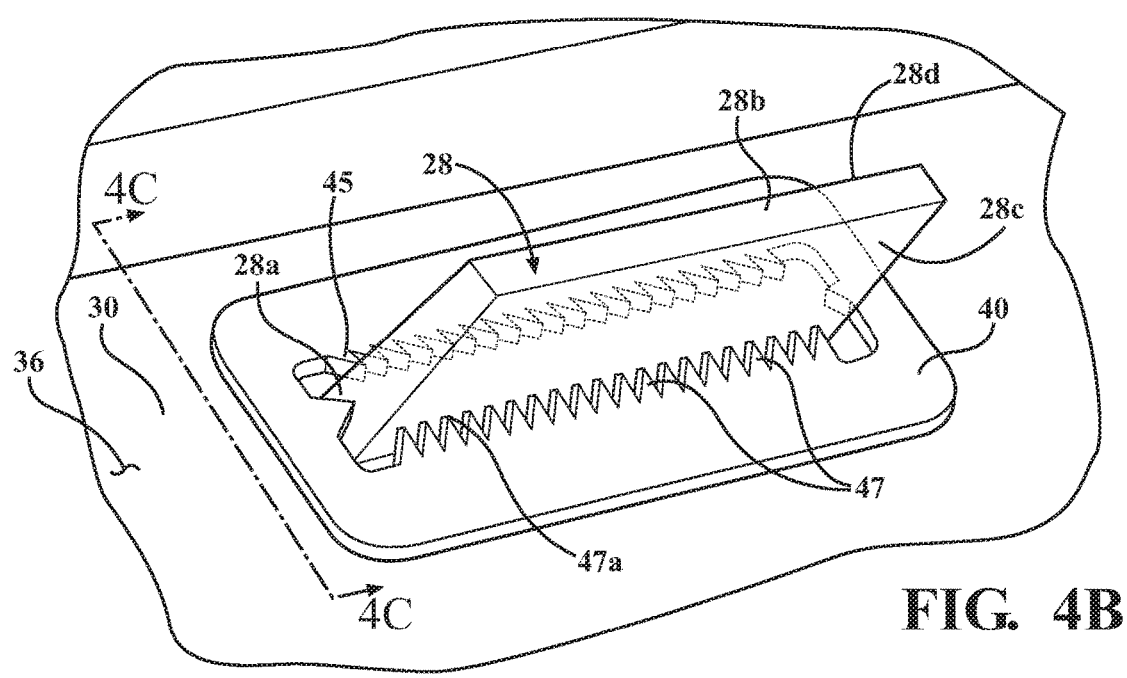
FIG. 4B is a magnified schematic view of a portion of the grille assembly shown in FIG. 4A.
Figure 4C:
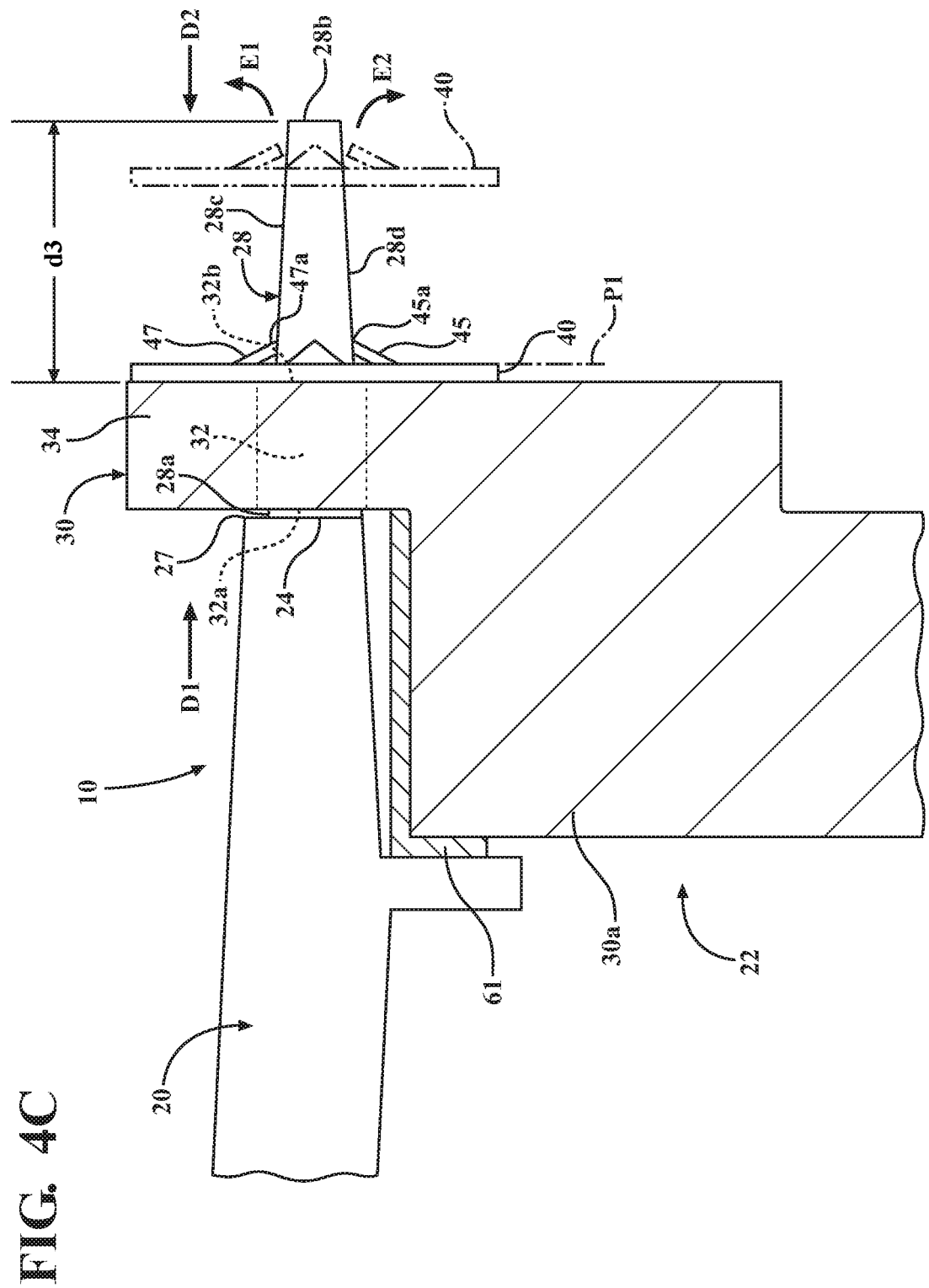
FIG. 4C is a schematic side cross-sectional view of the portion of the grille assembly shown in FIG. 4B.

As seen in FIGS. 1D, 4A, and 4C, the grille 20 may include one or more hard stop(s) 29 extending along a perimeter of the grille opening 22 and opposite a portion of the grille attachment 30. The hard stop(s) 29 may extend along opposite sides of the grille opening 22. The hard stop(s) 29 may be structured to limit a distance d3 past which each tab end portion 28b extends past the second end 32b of an associated grille attachment slot 32 (described below) when the tab 28 is inserted into the slot 32 as seen in FIG. 4C. This may control a degree of deflection of serrations 45, 47 of retaining member 40 (described below) during application of the retaining member to an associated tab 28. The hard stop(s) 29 may also control a depth to which the body portion 30a of the grille attachment 30 is received in the grille opening 22.

Figure 2:
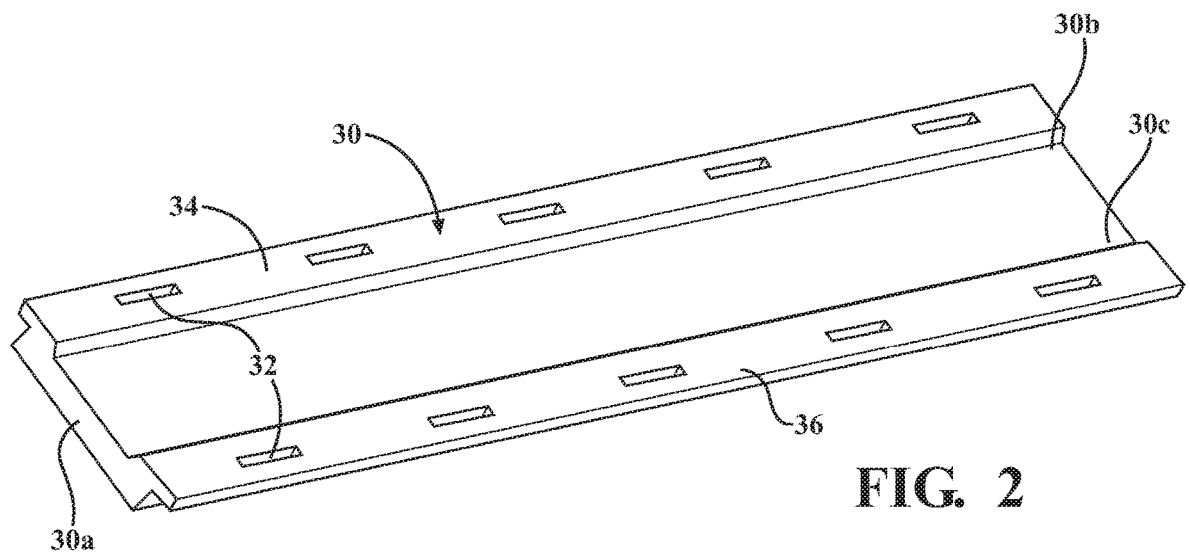
FIG. 2 is a schematic rear perspective view of a grille attachment in accordance with an embodiment described herein.

Referring now to FIG. 2, the grille attachment 30 may include at least one slot 32 structured for receiving an associated one of the grille tabs 28 therein. In one or more particular arrangements, the grille attachment 30 may have a body portion 30a and a first flange 34 extending from a first side 30b of the body portion 30a. The first flange 34 may have at least one slot 32 structured to receive a first tab 28 therein. A second flange 36 may extend from a second side 30c of the body portion 30a opposite the first side 30b. The second flange 36 may have at least one slot 32 structured to receive a second tab 28 therein. The embodiment of the grille attachment shown in FIGS. 2 and 4A includes multiple slots formed along each of flanges 34 and 36 to receive associated ones of tabs 28 of FIG. 1B therein. The grille attachment 30 of FIG. 2 shows an arrangement of slots 32 corresponding to the arrangement of tabs 28 shown in FIG. 1B. At least part of the body portion 30a may be structured to be received in the grille opening 22.

Referring to FIG. 4C, each slot may be structured so that the associated one of the grille tabs 28 extends into a first end 32a of the slot, through the length of the slot 32, and out of the slot past a second end 32b of the slot spaced apart from the first end 32a of the slot 32. The grille attachment 30 may be an element incorporating a design or emblem, a light source, or any other desired element or device. In one or more arrangements, the grille attachment 30 may be a light source, such as an organic light-emitting diode (OLED) light module.

To mount the grille attachment 30 to the grille 20, the slots 32 in the grille attachment flanges 34, 36 may be aligned with the grille tabs 28. Then the grille attachment 30 may be pushed toward the grille 20. In one or more particular arrangements, as seen in FIG. 4C, a spacer or gasket 61 may be positioned between the grille hard stop(s) 29 and the grille attachment 30. The spacer 61 may be formed from a material such as an ethylene propylene terpolymer (EPT) rubber to help absorb vibration and prevent rattling.

Figure 3:
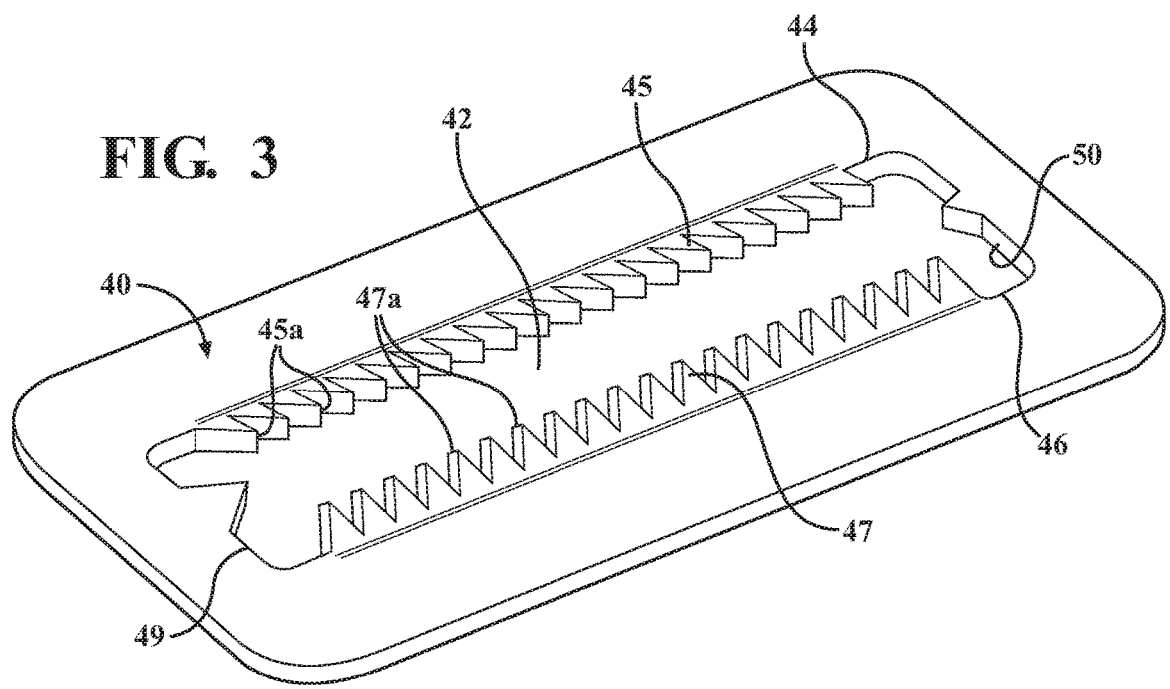
FIG. 3 is a schematic rear perspective view of a retaining member in accordance with an embodiment described herein.

Referring to FIGS. 3, 4B, and 4C, after the grille attachment 30 has been mounted on the tabs 28, a retaining member 40 may be applied to the tabs 28 in a manner described herein to secure the grille attachment 30 to the grille 20. The retaining member 40 may have an opening 42 structured to receive therein an associated one of tabs 28. Opening 42 may have a pair of opposed edges 44 and 46.

Retaining member 40 may include a plurality of serrations extending from at least one edge of the opening 42 in a direction toward the opening. In the embodiment shown, the retaining member 40 includes a first plurality of serrations 45 extending from edge 44 a direction toward the opening 42, and a second plurality 47 of serrations extending from opposite edge 46 a direction toward the opening 42. End edges 49 and 50 of opening 42 may also have one or more additional serrations formed therealong. The retaining member opening 42 may have a rectangular shape so that each edge of the opening 42 is spaced apart a predetermined distance from and opposite an associated portion of a tab 28.

In embodiments described herein, the serrations 45, 47 may be structured to contact at least one of the two opposed faces 28c, 28d of an associated tab 28 so as to resiliently deflect in directions E1 and E2 as the retaining member 40 is applied to the tab 28 in a direction D2 leading from the tab end portion 28b toward the tab base portion 28a so as to insert the tab 28 into the retaining member opening 42. This generates a retention force acting between the plurality of serrations 45, 47 and the grille tab 28 to retain the retaining member 40 and the grille attachment 30 on the tab 28. "Resilient deflection" of the serrations is defined herein to mean that, after the retaining member 40 has been pushed down a length of the tab 28 so as to reside adjacent the tab base portion 28a as shown in FIG. 4C, the serrations retain at least some degree of resiliency or elasticity which would tend to return the serrations to their undeflected states in the absence of contact with the tab 28. This helps ensure that a bearing or retention force is generated between the serrations 45, 47 and the tab 28 even after the retaining member 40 has been fully applied to or seated on the tab 28.

In embodiments having serrations formed along a single edge of the retaining member opening 42, one face of the tab 28 may bear against one of edges 44, 46 of the retaining member opening without the serrations, while the serrations along the opposite edge of the opening 42 press against the opposite face of the tab 28.

Referring to FIG. 4C, in one or more arrangements the serrations 45, 47 may be formed in a first direction D1 out of a plane P1 of the retaining member 40 prior to contact with the tab 28, and the retaining member 40 may be structured for application to the tab 28 so that the tab is inserted into the retaining member opening 42 in the first direction D1. This forming of the serrations 45, 47 in direction D1 may enable the serrations to provide lead-ins for the tab end portion 28b into the retaining member opening 42.

Referring to FIG. 4C, in one or more arrangements, the tab end portion 28b and the serrations 45, 47 may be structured so that the tab end portion 28b is insertable into the retaining member opening 42 without contacting any of the serrations 45, 47. During application of the retaining member 40 to the tabs 28 in direction D2, the serrations 45, 47 eventually come into contact with the tab 28 along faces 28c, 28d. In addition, due to the tapering of the tab 28, the deflections of the serrations 45, 47 may increase as a distance between the tab base portion 28a and retaining member 40 decreases as the retaining member is pushed toward the tab base portion 28a. This arrangement may minimize any force needed to initially position the retaining member 40 onto the tab 28. Then, all or most of the force needed to apply or seat the retaining member 40 on the tab 28 may be needed only after the tab end 28a has been inserted through the retaining member opening 42 and the retaining member 40 is already well-positioned on the tab 28.

Referring to FIG. 4C, the serrations 45, 47 may be structured so that pointed ends or tips 45a, 47a of the serrations tend to bite into exterior surfaces of the tab 28 when a force is exerted on the retaining member 40 in the first direction D1 after the retaining member 40 is applied to the tab 28. This structure helps retain the retaining member 40 in position on the tab 28, so that the retaining member 40 fastens the grille attachment 30 to the grille 20.

Referring to FIG. 4C, in one or more arrangements, the serrations may be pre-bent (i.e., bent prior to contact with any portion of the tab 28) in the first direction D1 out of the plane P1 of the retaining member 40, and the retaining member 40 may be structured for application to the tab 28 so that the tab is inserted into the retaining member opening 42 in the first direction D1. This structure may provide a lead-in for insertion of the tab end portion 28b into the retaining member opening 42.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A grille assembly for a vehicle, the assembly comprising a vehicle grille including an opening with at least a pair of opposed edges, at least one tab extending along at least one edge of the pair of opposed edges, the at least one tab having a base portion, an end portion, and two opposed faces extending between the base portion and end portion, the at least one tab having a rectangular cross-sectional shape, the at least one tab being tapered such that a cross-sectional area of the at least one tab taken along a plane extending perpendicular to either face of the opposed faces decreases in a direction extending from the base portion toward the end portion.

2. The grille assembly of claim 1 wherein at least one tab extends along each edge of the pair of opposed edges of the grille opening, each tab having a base portion, an end portion, and two opposed faces extending between the base portion and end portion, each tab being tapered such that a cross-sectional area of the tab taken along a plane extending perpendicular to either face of the opposed faces of the tab decreases in a direction extending from the base portion toward the end portion.

3. The grille assembly of claim 1 further comprising a grille attachment having at least a portion structured to be received in the grille opening, the grille attachment including at least one slot structured for receiving the at least one tab therein, the at least one slot being structured so that the at least one tab extends into a first end of the at least one slot, through the at least one slot, and out of the at least one slot past a second end of the at least one slot spaced apart from the first end of the at least one slot.

4. The grille assembly of claim 3 wherein the vehicle grille includes a hard stop positioned adjacent each edge of the pair of opposed edges of the grille opening, and wherein the grille assembly further comprises a spacer positioned between the hard stop and the grille attachment.

5. The grille assembly of claim 3 wherein the grille attachment comprises an organic light-emitting diode (OLED) light source module.

6. The grille assembly of claim 3 wherein the grille attachment includes:
   a body portion;
   a first flange extending from a first side of the body portion and opposite the a first edge of the grille opening, the first flange having at least one slot structured to receive an associated tab therein; and
   a second flange extending from a second side of the body portion opposite the first side, the second flange having at least one slot structured to receive an associated second tab therein.

7. A grille assembly for a vehicle, the assembly comprising a vehicle grille including an opening with at least a pair of opposed edges, at least one tab extending along at least one edge of the pair of opposed edges, the at least one tab having a base portion, an end portion, and two opposed faces extending between the base portion and end portion, the at least one tab being tapered such that a cross-sectional area of the at least one tab taken along a plane extending perpendicular to either face of the opposed faces decreases in a direction extending from the base portion toward the end portion, the grille attachment having at least a portion structured to be received in the grille opening, the grille attachment including at least one slot structured for receiving the at least one tab therein, the at least one slot being structured so that the at least one tab extends into a first end of the at least one slot, through the at least one slot, and out of the at least one slot past a second end of the at least one slot spaced apart from the first end of the at least one slot, the grille assembly further comprising a retaining member having an opening structured to receive therein the at least one tab, and a plurality of serrations extending from at least one edge of the opening in a direction toward the opening, the serrations of the plurality of serrations being structured to contact at least one face of the two opposed faces of the at least one tab so as to resiliently deflect as the retaining member is applied to the at least one tab in a direction leading from the at least one tab end portion toward the at least one tab base portion so as to insert the at least one tab into the retaining member opening, thereby generating a retention force acting between the plurality of serrations and the at least one tab to retain the retaining member on the at least one tab.

8. The grille assembly of claim 7 wherein each tab is tapered so that deflections of the serrations of the plurality of serrations increase as a distance between the tab base portion and retaining member decreases as the retaining member is applied to the tab.

9. The grille assembly of claim 7 wherein the serrations of the plurality of serrations are formed in a first direction out of a plane of the retaining member prior to contact with the tab, and wherein retaining member is structured for application to the tab so that the tab is inserted into the retaining member opening in the first direction.

10. The grille assembly of claim 9 wherein serrations are structured so that tips of the serrations bite into exterior surfaces of the tab when a force is exerted on the retaining ring in the first direction after the retaining ring is applied to the tab.

11. The grille assembly of claim 7 wherein the retaining member opening has a first edge and a second edge opposite the first edge, a first plurality of serrations extending from the first edge in a direction toward the second edge, and a second plurality of serrations extending from the second edge in a direction toward the first edge.

12. A grille assembly for a vehicle, the assembly comprising a vehicle grille including an opening with at least a pair of opposed edges, at least one tab extending along at least one edge of the pair of opposed edges, the at least one tab having a base portion, an end portion, and two opposed faces extending between the base portion and end portion, the at least one tab being tapered such that a cross-sectional area of the at least one tab taken along a plane extending perpendicular to either face of the opposed faces decreases in a direction extending from the base portion toward the end portion, the grille assembly further comprising a grille attachment having at least a portion structured to be received in the grille opening, the grille attachment including at least one slot structured for receiving the at least one tab therein, the at least one slot being structured so that the at least one tab extends into a first end of the at least one slot, through the at least one slot, and out of the at least one slot past a second end of the at least one slot spaced apart from the first end of the at least one slot, the grille attachment also including an organic light-emitting diode (OLED) light source module.

\* \* \* \* \*